United States Patent [19]

Gruber

[11] Patent Number: 4,762,155

[45] Date of Patent: Aug. 9, 1988

[54] METHOD AND KIT FOR REMOVING AND DISPOSING OF OIL FROM A VEHICLE

[75] Inventor: David E. Gruber, Libson, Ohio

[73] Assignee: Ganeaux Industries, Inc., Salem, Ohio

[21] Appl. No.: 109,191

[22] Filed: Oct. 16, 1987

[51] Int. Cl.$^4$ ................................................ B67C 9/00
[52] U.S. Cl. ........................................ 141/10; 184/1.5
[58] Field of Search ............................ 141/10, 11, 69; 184/1.5; 220/1 C

[56] References Cited

U.S. PATENT DOCUMENTS 3,771,493 11/1973 Chandor ................................... 119/1
3,980,153 9/1976 Andrews ............................... 180/69.1
4,022,257 5/1977 O'Connell ......................... 184/1.5 X

*Primary Examiner*—Mark J. Thronson
*Attorney, Agent, or Firm*—Michael Sand Co.

[57] ABSTRACT

A kit and method for removing and disposing of oil from the crankcase of a vehicle includes an open top plastic support pan, and a plastic bag containing a predetermined quantity of granular clay. The bag is placed in the pan and the top thereof is folded over a top rim of the pan to expose the granular clay afterwhich the pan is placed beneath the drain of the crankcase. The oil flows into the clay and is absorbed thereby forming a moist granular material. The bag then is closed and secured by a usual twist tie wire. The bag is removed from the pan and deposited in a refuse container for subsequent transfer to a dump site. The used, collected oil is completely absorbed by the granular clay and is disposed of without harming the environment.

5 Claims, 1 Drawing Sheet

U.S. Patent  Aug. 9, 1988  4,762,155
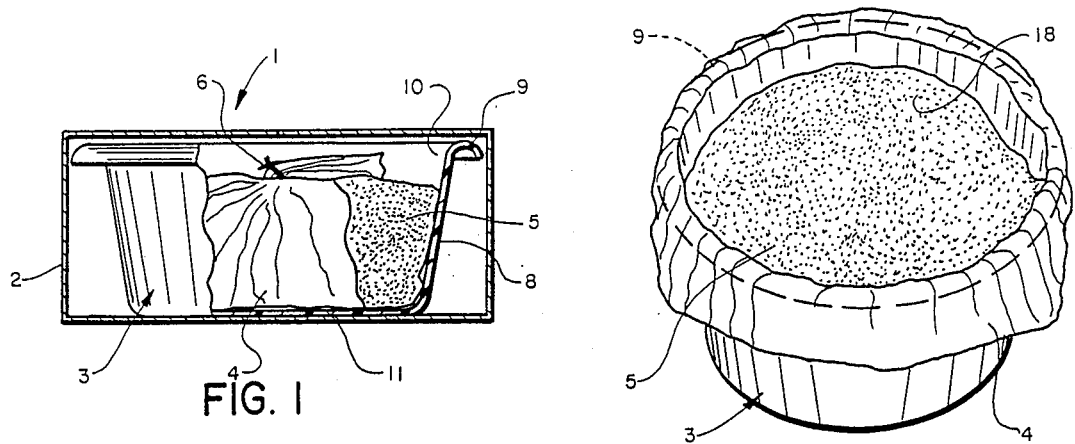
FIG. 1
FIG. 2
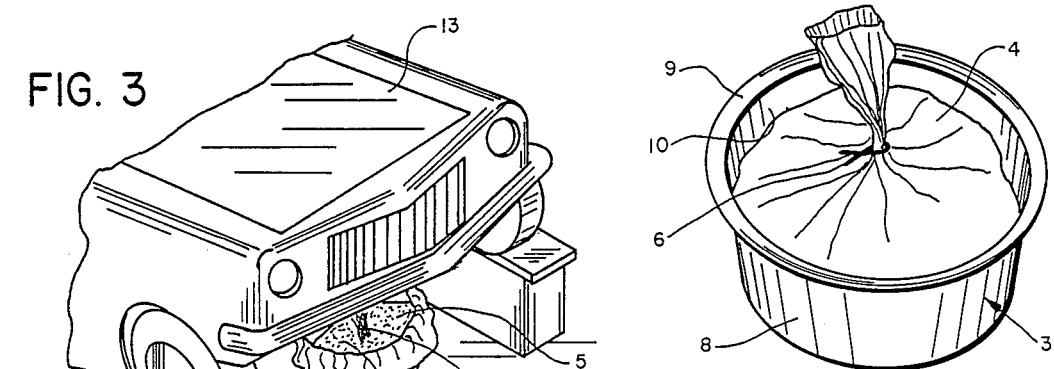
FIG. 3
FIG. 4
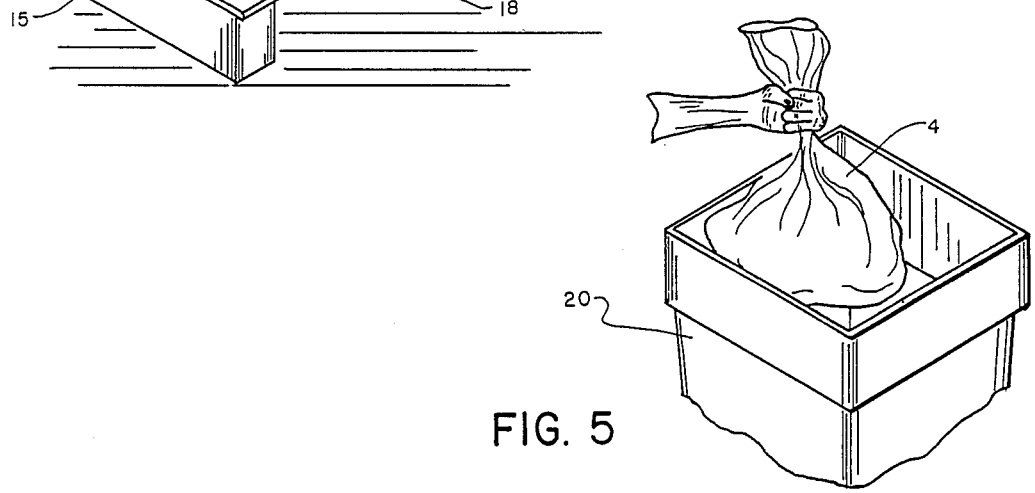
FIG. 5

METHOD AND KIT FOR REMOVING AND DISPOSING OF OIL FROM A VEHICLE

TECHNICAL FIELD

The invention relates to a combination of articles and in particular to such articles in kit form for satisfactorily removing and disposing of the oil from the crankcase of a vehicle eliminating the heretofore problem of properly disposing the liquid oil without harming the environment. More particularly the invention relates to such a kit and to the method of removing and disposing of the oil from the vehicle which is both efficient and convenient for the user, especially the handyman or home-style mechanic.

BACKGROUND ART

Many vehicle owners change the oil in their vehicle since the same is relatively easy and does not require mechanical skills. The home mechanic need only place a container beneath the crankcase of the vehicle and remove the drain plug whereby the engine oil flows into the container. After the crankcase is empty the drain plug is reinstalled and new oil placed in the engine.

However, one common problem that exists for all such home mechanics is the disposal of the oil removed from the crankcase, usually between five and seven quarts, in a satisfactory manner. Heretofore, most home mechanics pour the collected, used oil down a drain, which is harmful to the sanitary system into which the drain ultimately flows, or harmful to the surrounding watershed. Another common means of disposing the used oil is to pour it out into a vacant area of ground which, in addition to killing the vegetation, will eventually seep into the watershed harming the environment. Still another way is to place it in another container and place it in a trash container for ultimate transportation to a landfill or disposal site. However, this requires placing the used oil into a separate container which is both messy and difficult and many times will result in the oil spilling within the trash container with the resultant mess and unsightly appearance.

Therefore, the need exists for an improved method for removing and especially for disposing of the collected oil from a vehicle for use by the home mechanic, and for an inexpensive, convenient kit whereby the usual home mechanic can remove the oil without the heretofore resultant mess and possible harm to the environment by the unsatisfactory, and in some cases, unlawful disposal of the collected oil.

DISCLOSURE OF THE INVENTION

Objectives of the invention include providing a kit for removing and disposing of oil from a vehicle which can be purchased by a usual home mechanic at an auto supply store or usual retail store in a single package containing all of the articles needed for the proper removal and disposal of the vehicle oil, namely a drain pan and a plastic sack containing a predetermined quantity of granular clay material which absorbs the oil and retains it in the plastic bag for subsequent disposal in a trash receptacle, without the subsequent problem of the oil leaking from the bag and contaminating the environment.

Still another objective of the invention is to provide such a kit which is relatively inexpensive and, therefore, does not increase considerably the cost of an oil change for the home mechanic; and in which the individual articles of the kit are contained in an easily transported package which includes all of the elements necessary for changing the oil, except for the new oil which can be purchased separately for refilling the engine after removal of the used oil therefrom.

Still another objective of the invention is to provide such a kit which contains a granular absorbant material sufficient to properly absorb the usual quantity of oil contained in most engines whereby the resulting material is a moist granular material similar to wet sand, which then can be handled easily for subsequent disposal, and which eliminates the heretofore unlawful or unsatisfactory disposal of the liquid oil.

Further objectives and advantages of the invention include providing such a kit and the method of using the same for removing and disposing of the oil without requiring any additional skill on the part of the home mechanic, which completely eliminates the heretofore messy condition resulting during and after the oil has been removed from the vehicle and, most importantly, eliminates the improper disposal of the used oil.

These objectives and advantages are obtained by the improved kit of the invention for removing and disposing of oil from a vehicle, the general nature of which may be stated as including a drain pan; a bag having an open top adapted to be placed in said drain pan for placement beneath an oil drain opening of a vehicle crankcase; and a predetermined quantity of granular clay material in said bag for absorbing the oil flowing into the bag through the open top thereof.

These objectives and advantages are obtained further by the improved method of the invention, the general nature of which is a method for removing and disposing of oil from the crankcase of a vehicle engine by using a flexible bag containing a predetermined amount of granular clay in combination with a support pan, in which said method includes the steps of; placing the bag containing the granular clay in the support pan; turning a top portion of the flexible bag which defines an open end of the bag down over a top edge of the support pan to expose the granular clay; placing said pan, bag and granular clay beneath an oil drain opening of a vehicle crankcase; removing a drain plug from the crankcase whereby the oil within the crankcase flows through the open top of the bag and into the granular clay and is absorbed thereby; and removing the bag from the pan and placing it in a refuse container for subsequent transportation to a disposal site.

BRIEF DESCRIPTION OF THE DRAWINGS

A preferred embodiment of the invention, illustrative of the best mode in which applicant contemplates applying the principles of the invention and for carrying out the method steps thereof, is set forth in the following description and is shown in the drawings and is particularly and distinctly pointed out and set forth in the appended claims.

FIG. 1 is a side elevational view with portions broken away and in section, showing the improved kit of the invention for carrying out the method steps thereof;

FIG. 2 is a perspective view showing the support pan containing the plastic bag of granular clay material ready for receiving the drained oil from a vehicle;

FIG. 3 is a diagrammatic perspective view showing the pan and granular material of FIG. 2 placed beneath the crankcase of an engine receiving the oil flowing therefrom;

FIG. 4 is a diagrammatic perspective view showing the plastic bag in a closed position after receiving the drained oil from the vehicle of FIG. 3; and FIG. 5 is a diagrammatic perspective view showing the subsequent disposal of the bag containing the collected oil and granular clay in a waste container.

Similar numerals refer to similar parts throughout the drawings.

BEST MODE FOR CARRYING OUT THE INVENTION

The kit of the invention is indicated generally at 1, and is shown in FIG. 1, and consists of an outer package 2, a drain pan 3, a plastic bag 4, a supply of granular clay material 5, and a flexible twist tie 6.

Package 2 preferably is a usual cardboard box large enough to contain pan 3 and can be used for the shipment, storage and display of the articles contained therein. Pan 3 is an inexpensive molded plastic container sufficiently strong to support plastic bag 4 and the supply of granular clay 5 without breaking or tearing. Preferably, pan 3 has a cylindrical or conical-shaped side wall 8 which terminates in an outwardly turned peripheral edge 9 which defines an open top 10. Pan 3 preferably is a relatively shallow pan wherein the diameter of its bottom wall 11 is at least twice the height of the side wall. Preferably the side wall is approximately four inches high and the bottom wall has a diameter of approximately nine inches. This dimensional relationship provides a sufficiently large open top 10 for insuring that the oil draining from the crankcase of a vehicle will flow into the pan, and not onto the surrounding ground or driveway.

Plastic bag 4 is formed of a usual thin sheet plastic material, for example 2-4 mils thick, and formed of a usual polyethylene resin or similar material. The main requirement is that it be waterproof and has sufficient stength to support the combined weight of the granular clay material and the oil to be collected and absorbed by the granular material.

A home mechanic upon purchasing kit 1 will remove pan 3 in which bag 4 containing a predetermined quantity of granular clay material 5 is contained and will remove the twist tie wire 6 which closes the bag for shipment and storage. Bag 4 and clay material 5 have been previously placed into pan 3 prior to then being placed in package 2 as shown in FIG. 1. The user then will fold the open top of the bag downwardly along the outside of pan 3 and over rolled edge 9 to completely expose granular material 5 contained therein as shown in FIG. 2. A sufficient amount of granular clay 5 is in bag 4 to absorb between 5 and 7 quarts of oil, which is the usual amount of oil present in most vehicle engines. Approximately five pounds of clay material 5 has been found to be a sufficient amount. The pan and open top bag 4, as shown in FIG. 3, are then slid beneath a crankcase (not shown) of a usual vehicle 13 (FIG. 3). Vehicle 13 may have its front wheels 14 supported on ramps 15 for ease of access to the crankcase drain. For certain vehicles the front end need not be raised on ramps 15 since the pan is shallow enough to be slid easily beneath the crankcase of the vehicle.

The home mechanic then removes the usual drain plug from the crankcase permitting the oil, indicated at 17, to flow directly into the open top 18 of bag 4 and into granular clay 5. The oil is absorbed by the granular clay and forms a moist granular material similar to wet sand, completely eliminating the free flow or liquid characteristic of the oil. After all of the oil has been drained from the crankcase, the pan is removed from beneath the vehicle and the bag is closed and secured by twist tie 6 as shown in FIG. 4. The mechanic then merely lifts the bag containing the moist granular clay material and absorbed oil and drops it into a waste or refuse container 20 for subsequent transfer by a usual trash collection service to a disposal site. The oil remains in a nonliquid state absorbed in granular clay 5, until it is ultimately destroyed or properly disposed of in a landfill.

The particular kit of the invention as shown in FIG. 1 is relatively inexpensive, consisting only of the three main components and a twist tie 6. Pan 3 provides adequate support at all times for the plastic bag and the granular clay including the oil when drained from the vehicle and collected in the bag. The bag is strong enough to enable the mechanic to lift the bag containing the oil and granular clay out of pan 3 for subsequent placement in trash container 20. Pan 3, if desired, can be reused for other household chores by the home mechanic since the same has not come into contact with the oil or granular clay and therefore provides a clean container for other home uses. Furthermore, the home mechanic will not contact the used oil at any time or contact the moist granular clay which heretofore resulted in spilled oil and soiled driveways, yards, or trash containers.

The relatively shallow construction and wide top opening of pan 3, as shown in FIGS. 2 and 3, insures that the oil draining from the vehicle will flow directly into the granular clay material and not accidentally onto the surrounding driveway or ground beneath the vehicle as heretofore occurs in many oil-changing jobs.

Accordingly, the improved invention provides an extremely inexpensive, yet efficient self-contained kit, for removal and, most importantly, proper disposal of oil from a vehicle by a usual home mechanic without the heretofore resultant mess and improper oil disposal, and provides a method for removing and disposing of the oil from the vehicle in an extremely efficient, economical and safe manner.

Accordingly, the kit and method for removing and disposing of oil from a vehicle is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved kit and method for removing and disposing of oil from a vehicle is constructed and used, the characteristics of the kit and method, and the advantageous, new and useful results obtained; the new and useful structures, devices, elements, arrangements, parts, combinations and method steps are set forth in the appended claims.

What is claimed is:

1. A method of removing and disposing of oil from the crankcase of a vehicle engine by using a flexible bag containing a predetermined amount of granular clay and a support pan, said method including the steps of:
   (a) placing the bag containing the granular clay in the support pan;
   (b) turning a top portion of the flexible bag which defines an open end of the bag, down over a top edge of the support pan to expose the granular clay;
   (c) placing said pan, bag, and granular clay beneath an oil drain of a vehicle crankcase;
   (d) removing a drain plug from the crankcase and allowing oil within the crankcase to drain from the crankcase and into the granular clay and be absorbed thereby; and
   (e) removing the bag containing the granular clay and absorbed oil from the pan and placing it in a refuse container for subsequent transportation to a disposal site.

2. The method defined in claim 1 including the steps of closing the open end of the bag after the oil has drained from the crankcase and securing the open end of the bag in a closed position after closing said open end and before removing the bag from the pan.

3. The method defined in claim 1 in which the bag is formed of flexible plastic material.

4. The method defined in claim 1 in which the pan is formed of rigid plastic material.

5. The method defined in claim 1 in which the bag contains approximately five pounds of the granular clay.

* * * * *